United States Patent [19]

Stobart

[11] 3,961,166

[45] June 1, 1976

[54] VEHICLE LOCATING APPARATUS

[75] Inventor: Charles R. Stobart, Richardson, Tex.

[73] Assignee: E-Systems, Inc., Dallas, Tex.

[22] Filed: Jan. 24, 1975

[21] Appl. No.: 543,883

[52] U.S. Cl.................... 235/150.27; 235/150.2; 340/24
[51] Int. Cl.²........................................ G06F 15/50
[58] Field of Search....... 235/150.2, 150.24, 150.27; 340/24

[56] References Cited
UNITED STATES PATENTS

| | | | |
|---|---|---|---|
| 3,749,893 | 7/1973 | Hileman............. | 235/150.27 |
| 3,849,636 | 11/1974 | Helms............... | 235/150.27 |
| 3,882,501 | 5/1975 | Botzum............. | 235/150.27 |

*Primary Examiner*—Felix D. Gruber
*Attorney, Agent, or Firm*—Robert V. Wilder

[57] ABSTRACT

A timing circuit receives substantially square wave clock signals and generates sine and cos driving signals therefrom at a predetermined frequency for application to first and second mutually perpendicular Hall effect generators. The output signals from the Hall effect generators are algebraically summed to provide a heading signal, the phase displacement of which with respect to the driving signals, is representaive of the orientation angle between one of the Hall effect generators and magnetic north. A counter is synchronized to begin to count clock pulses at the beginning of each period of the driving signals. A logic circuit is effective to disable the counter when the Count signal therein is representative of the orientation angle. The sine and cos of the Count signal are derived and each is multiplied by a distance signal related to the number of revolutions of a wheel of the vehicle being monitored. The resulting coordinate signals are stored in X and Y registers which are automatically updated when the vehicle approaches transmitters at predetermined locations.

8 Claims, 12 Drawing Figures

VEHICLE LOCATING APPARATUS

FIELD OF THE INVENTION

The present invention relates generally to vehicle locating apparatus and more particularly to a solid state vehicle locating apparatus including an automatically updated dead reckoning system.

BACKGROUND OF THE INVENTION

In the past, vehicle locating systems have been provided which utilize conventional compass devices for calculating an on-board location of a vehicle. While those "dead-reckoning" systems have been generally satisfactory, they are subject to several limitations. For example, when such systems are utilized in applications involving a severe environment in which physical impact, weather, and various other adverse factors are present, the conventional compass device provides a source of error. Further, such systems are also subject to the accumulation of errors unless they are periodically and automatically updated. U.S. Pat. Nos. 3,749,893 and 3,789,198 disclose exemplary dead reckoning systems and are included herein by reference.

Some proximity prior art systems do not even attempt to trace the incremental movements of the vehicle. In such systems, transceivers are placed at predetermined locations within an area and it can only be determined that a vehicle is within a designated range of those predetermined locations. In many applications, the precision of such a system is inadequate. Further, to improve the precision of those systems by increasing the number of transceivers and predetermined locations, is generally prohibitively expensive. U.S. Pat. No. 3,772,691 shows such a proximity system and is included herein by reference for its teaching of a proximity-type system.

Thus, there is a need for an improved vehicle locating system utilizing a solid state compass suitable for operation in an adverse environment and having the advantages of both dead reckoning and proximity location fixing techniques.

SUMMARY OF THE INVENTION

The vehicle locating system of the present invention features a digital solid state compass within an incrementally cumulative position locating system which further includes means for automatically updating the cumulatively determined location of the vehicle whenever the vehicle comes within the predetermined area of any of a plurality of predetermined locations at which individual transceivers transmit signals characteristic of the corresponding predetermined location.

BRIEF DESCRIPTION OF THE DRAWINGS

A better understanding of the present invention may be had from the following description when read in connection with the accompanying drawings in which.

DETAILED DESCRIPTION OF THE PREFERRED EMBODIMENT

Figure 1:
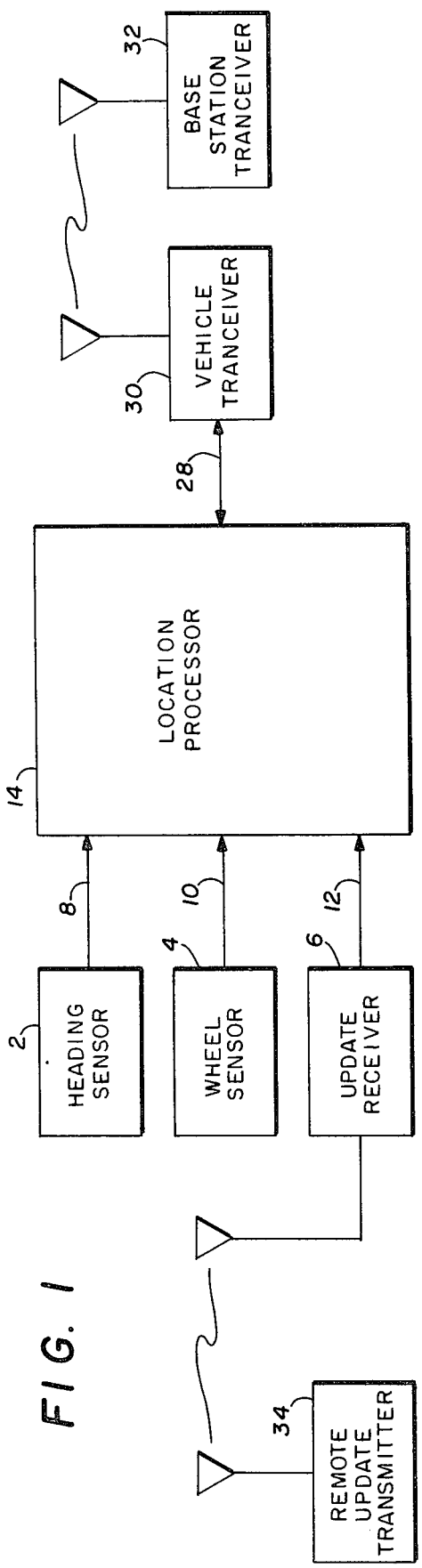
FIG. 1 is a schematic diagram of an embodiment of the present invention.

In FIG. 1, a heading sensor circuit 2, a distance detecting means or wheel sensor circuit 4, and an update receiver circuit 6 all have individual output lines 8, 10, and 12, respectively, feeding a location processor circuit 14. The location processor circuit 14 in turn has a two-way connection 28 to a vehicle transceiver circuit 30. The vehicle transceiver circuit 30 is arranged to transmit to and receive signals from a base station transceiver 32. A remote update transmitter 34 is shown for transmitting information to the update receiver 6. Generally, there are a plurality of the remote update transmitters 34 located at predetermined positions within a monitored area. Each transmitter 34 transmits position signals characteristic of its individual position within the monitored area. The heading sensor 2, wheel sensor 4, update receiver 6, location processor 14 and vehicle transceiver 30 may all be mounted within the vehicle being monitored. When the vehicle comes within a predetermined range of any of the plurality of remote update transmitters 34, the update receiver 6 of the vehicle receives the characteristic position signal from that particular transmitter 34 and enters that information into the location processor circuit 14 of the vehicle. The vehicle transceiver 30 transmits the vehicle location information to the base station transceiver 32. That location information is the result of the incremental movement of the vehicle as updated through the update receiver. That location information can be transmitted periodically, upon request, from the base station 32, or continually thereto, depending upon the application. As hereinafter explained, the location processor circuit 14 continually increments the location of the vehicle from the signals received from the heading sensor 2 and the wheel sensor 4. The cumulative location signal is stored in the location processor and updated when the vehicle is in the proximity of one of the remote update transmitters 34 to provide an accurate and precise vehicle location signal to the base station 32 as hereinafter explained in connection with FIG. 12.

Figure 2:
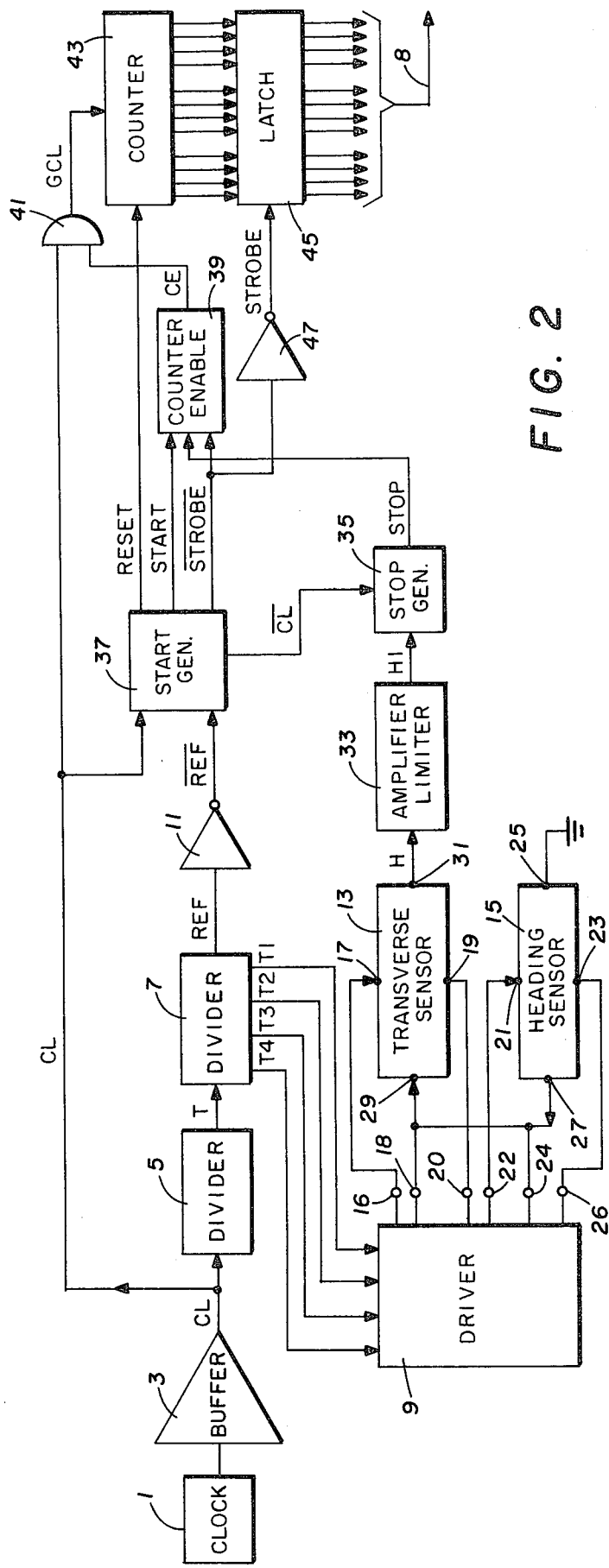
FIG. 2 is a schematic diagram of the heading sensor circuit of FIG. 1.

In FIG. 2 a clock oscillator 1 is connected to a buffer circuit 3 which provides a basic clock output signal CL at a first predetermined frequency. The clock signal CL is applied to a first divider circuit 5 which divides the clock signal CL by a factor of 30. The output of the first divider circuit T is applied to a second divider circuit 7 which in turn divides the signal T by a factor of 12.

Therefore, the combustion of the first divider circuit 5 and the second divider circuit 7 acts to divide the clock signal CL by a factor of 360. The second divider circuit 7 provides timing signals T1, T2, T3 and T4 to a driver circuit 9. The second divider circuit 7 also provides a reference signal REF which is applied to an inverter 11. The driver circuit 9 provides driving signals at output terminals 16, 18, 20, 22, 24, and 26 thereof to drive a Hall effect generating means comprising a transverse Hall effect sensor 13 and a heading Hall effect sensor 15. The driving signals are applied across input terminals 17 and 19 of the transverse sensor 13 and across input terminals 21 and 23 of the heading sensor 15. An output terminal 25 of the heading sensor 15 is connected to ground and another output terminal 27 of the heading sensor 15 is referenced to the driving circuit 9 and connected to an output terminal 29 of the transverse sensor 13. The other output terminal 31 of the transverse sensor 13 provides a heading signal H which is applied to an amplifier and limiter circuit 33. The amplifier-limiter circuit 33 modifies the heading signal H to provide a modified heading signal H1 in the form of a square wave for application to a stop signal generating means 35.

A start signal generating means 37 receives a clock signal as one input thereto and an inverted reference signal $\overline{REF}$ from the output of the inverter 11 as its other input signal. The start signal generating means 37 provides an inverted clock signal $\overline{CL}$ which is applied to the stop signal generating means 35. The start signal generating means 37 also provides a reset signal RESET, a start signal START, and an inverted strobe signal $\overline{STROBE}$. A counter enable circuit 39 receives as inputs thereto, the start signal START, the stop signal STOP, and the inverted strobe signal $\overline{STROBE}$. A counter enable output signal CE is applied to an AND gate 41 along with the clock signal CL. The gate 41 provides a gated clock signal GCL which is applied to a counter means 43. The counter means 43 receives the RESET signal from the start signal generating means 37 and provides, in the present example, a three digit binary coded signal to a latch circuit 45. The $\overline{STROBE}$ signal from the start signal generating means 37 is applied to an inverter circuit 47 thereby providing a strobe signal STROBE which is applied to the latch circuit 45. The latch circuit provides, in the present example, a three digit binary coded signal which may be applied to a readout or display device (not shown).

Figure 3:
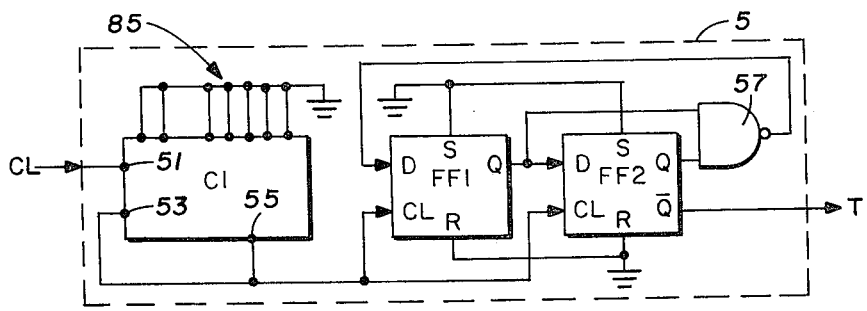
FIG. 3 is a schematic diagram of the first divider circuit shown in FIG. 2.

The first and second divider circuits 5 and 7 together comprise a timing signal generating means and the amplifier-limiter 33, stop signal generating means 35, counter enable signal generating means 39, and the gate 41 together comprise a control means. In the exemplary embodiment disclosed herein, a logic 0 level is ground and a logic 1 level is approximately 9 volts. terminal The details of the first divider circuit 5 are shown in FIG. 3. The clock signal CL is applied to an input terminal 51 of an integrated circuit C1. Terminals 53 and 55 of the integrated circuit C1 are connected together thereby providing a divide-by-10 circuit. The terminal 55 is also connected to the clock input terminals of two "D-type" flip-flop circuits FF1 and FF2. The set and reset terminals of the flip-flop circuits FF1 and FF2 are connected to the ground reference. The Q output terminal of FF1 is connected to the data input terminal of FF2. The Q output terminal of FF1 is also connected to one input terminal of a gate 57. The other input terminal of the gate 57 is connected to the Q output terminal of FF2. The output terminal of the gate 57 is connected to the data input terminal of FF1. The $\overline{Q}$ output terminal of FF2 provides the output signal T from the first divider circuit 5. The configuration of FF1 and FF2 forms a divide-by-three circuit.

Figure 4:
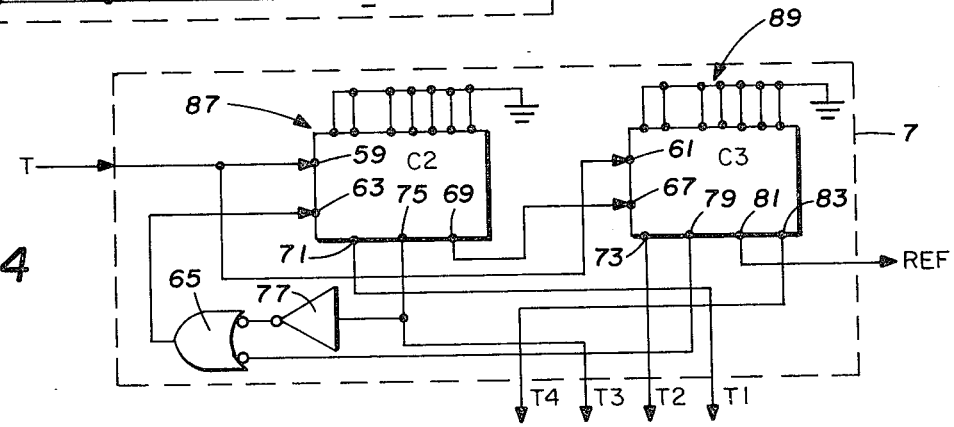
FIG. 4 is a schematic diagram of the second divider circuit shown in FIG. 2.

The internal connections of the second divider circuit 7 are shown in detail in FIG. 4. The input signal T is applied to input terminals 59 and 61 of integrated circuits C2 and C3, respectively. All three integrated circuits C1, C2 and C3, in the present example, are RCA catalog number CD4018 AE, and all of the flip-flop circuits are RCA catalog number CD4013 AE. Another input terminal 63 of the integrated circuit C2 is connected to the output terminal of a gate 65. A second input terminal 67 of the integrated circuit C3 is connected to an output terminal 69 of the circuit C2. Another output terminal 71 of the circuit C2 provides the timing signal T1. An output terminal 73 of circuit C3 provides the timing signal T2 and the output signal T3 is provided by the output terminal 75 of the integrated circuit C2. The output terminal 75 of the integrated circuit C2 is also connected through an inverter 77 to one input terminal of the gate 65. The other input terminal of the gate 65 is connected to the output terminal 79. The output terminal 81 of the circuit C3 provides the reference signal REF and the output terminal 83 of the circuit C3 provides the timing signal T4.

In the first integrated circuit C1, the terminals 51, 53 and 55 correspond, respectively, to manufacturer-designated terminals CL, D, and Q5. Manufacturer-designated terminals R, PE, and J1–J5, are all connected to ground as generally indicated at 85. In the second integrated circuit C2, terminals 59, 63, 71, 75, and 69, correspond, respectively, to manufacturer-designated terminals CL, D, Q1, Q4, and Q5. In the third integrated circuit C3, the terminal 61, 67, 73, 79, 81, and 83, correspond, respectively, to manufacturer-designated terminals CL, D, Q2, Q3, Q4, and Q5. In both the second and third integrated circuits C2 and C3, the manufacturer-designated terminals R, PE, and J1–J5 are connected to ground as generally indicated at 87 and 89, respectively. Terminals of three integrated circuits C1, C2, and C3 as well as terminals of the flip-flop circuits of the present disclosure which are not specifically shown, are left unconnected. The particular interconnections of the two integrated circuits C2 and C3 form a divide-by-12 circuit having waveforms specifically suited to providing drive to the Hall effect generators having low harmonic content and quadrature relationship.

Figure 5:
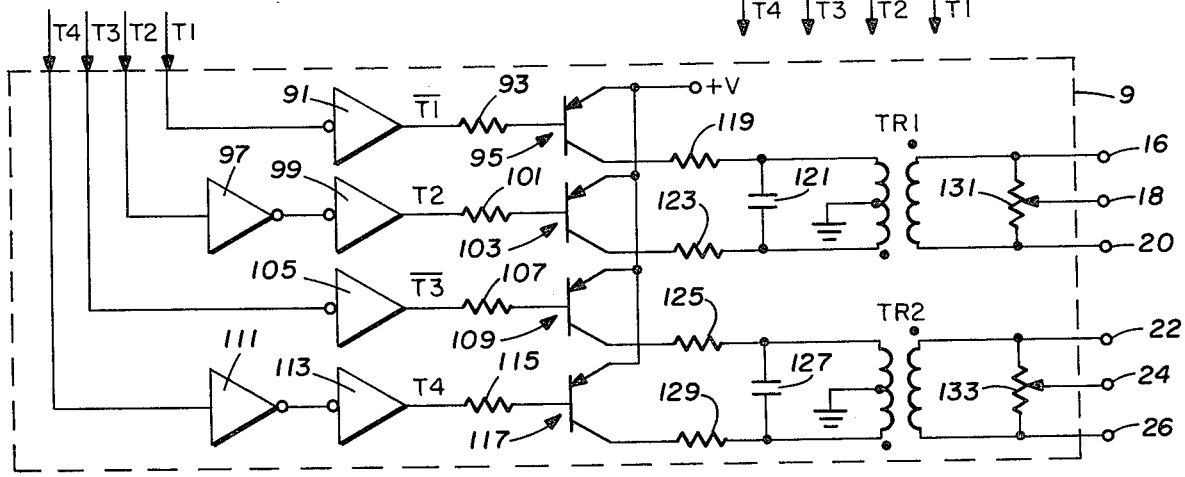
FIG. 5 is a schematic diagram of the driver circuit shown in FIG. 2.

The internal connections of the driver circuit 9 are shown in detail in FIG. 5. The timing signal T1 is applied to an inverter 91, the output of which is connected through a resistor 93 to the base terminal of a transistor 95. The timing signal T2 is applied to the input terminal of an inverter 97. The output terminal of the inverter 97 is connected to the input terminal of another inverter 99, the output terminal of which is connected through a resistor 101 to the base terminal of another transistor 103. The timing signal T3 is applied to an inverter 105, the output terminal of which is connected through a resistor 107 to the base terminal of a transistor 109. The timing signal T4 is applied to an inverter 111. The output terminal of the inverter 111 is connected to the input terminal of another inverter 113. The output terminal of the inverter 113 is connected through a resistor 115 to the base signal of another transistor 117. The emitter terminals of the four transistors 95, 103, 109 and 117 are all connected together to a +V potential which, in the present example, is 9 volts. The collector terminal of the transistor 95 is connected through a resistor 119 to one terminal of a capacitor 121. The other terminal of the capacitor 121 is connected through a resistor 123 to the collector terminal of the transistor 103. Similarly, the collector terminal of the transistor 109 is connected through a resistor 125 to one terminal of a capacitor 127. The other terminal of the capacitor 127 is connected through a resistor 129 to the collector terminal of the transistor 117. The primary winding of a transformer TR1 is connected across the capacitor 121. Likewise the primary winding of a second transformer TR2 is connected across the capacitor 127. The primary winding of each of the transformers TR1 and TR2 has a center tap which is connected to ground. The secondary winding of the transformer TR1 is connected across a potentiometer 131. Similarly, the secondary winding of the second transformer TR2 is connected across a potentiometer 133. The wiper arm of potentiometer 131 is connected to the terminal 18, and the wiper arm of potentiometer 133 is connected to the terminal 24. One end terminal of the potentiometer 131 is connected to the terminal 16 while the other end terminal of the potentiometer 131 is connected to the terminal 20. Likewise, the end terminals of the potentiometer 133 are connected to terminals 22 and 26, respectively. The potentiometers 131 and 133 provide a means for trimming out unbalances in the Hall effect generators. The driving or excitation signals appearing at the terminals 16, 18, 20, 22, 24, and 26 are applied to the Hall effect generating means as shown in FIG. 1. The transistors 95 and 103 comprise a first switching means which respond to a first set of switching signals T1 and T2 and the transistors 109 and 117 comprise a second switching means which respond to a second set of timing signals T3 and T4. The capacitor 121 and the primary winding of the transformer TR1 comprise a first resonant circuit means and the capacitor 127 and the primary winding of the transformer TR2 comprise a second resonant circuit means.

Figure 6:
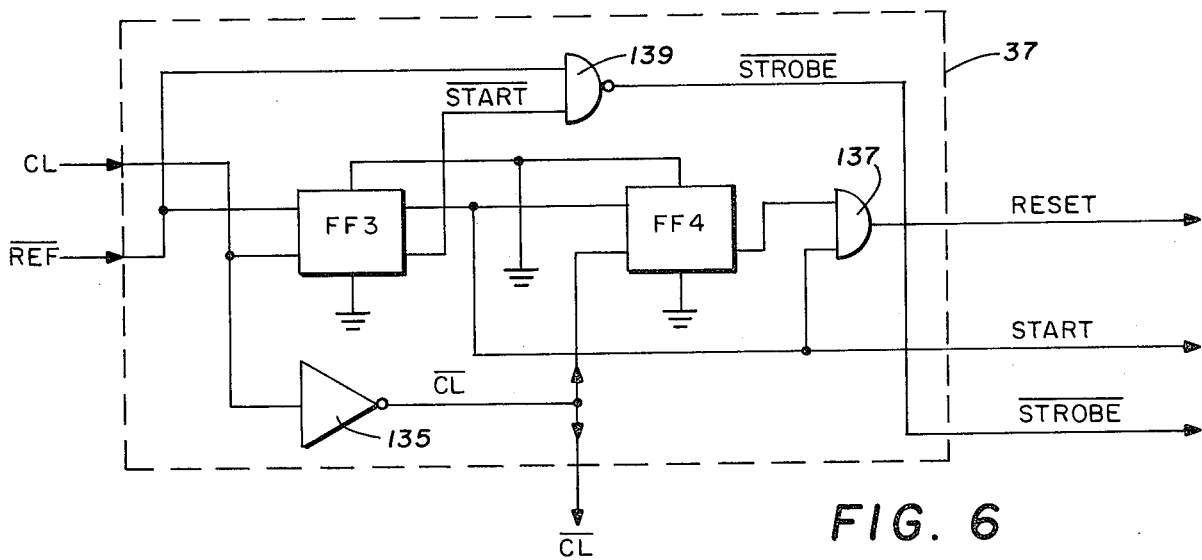
FIG. 6 is a schematic diagram of the start signal generator shown in FIG. 2.

The internal connections of the start signal generating means 37 are shown in detail in FIG. 6. The flip-flop circuit FF3 receives the clock signal CL at its clock input terminal and the inverted reference signal $\overline{REF}$ at its data input terminal. The clock signal CL is also applied to an inverter 135 from which an inverted clock signal $\overline{CL}$ is applied to the clock input terminal of another flip-flop circuit FF4. The inverted clock signal $\overline{CL}$ is also provided as an output from the start signal generating means 37. The Q output terminal of FF3 is connected to the data input terminal of FF4. The Q output terminal of FF3 also provides the START output signal. The set and reset terminals of both flip-flops FF3 and FF4 are connected to the ground reference. The $\overline{Q}$ output terminal of FF4 is connected to one input terminal of a gate 137, the other input terminal of which receives the START signal. The output terminal of the gate 137 provides the RESET output signal of the start signal generating means 37. Another gate 139 receives at one input terminal thereof the $\overline{REF}$ signal. The other input terminal of the gate 139 is connected to the $\overline{Q}$ output terminal of FF3. The output terminal of gate 139 provides the $\overline{STROBE}$ signal as an output of the start signal generating means 37.

Figure 7:
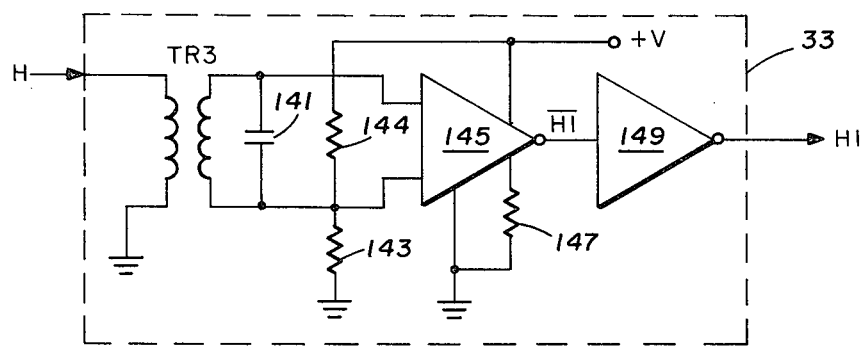
FIG. 7 is a schematic diagram of the amplifier-limiter shown in FIG. 2.

In FIG. 7, the details of the amplifier-limiter circuit 33 are shown. The heading signal H from the Hall effect elements 13 and 15 is applied to one terminal of the primary winding of a transformer TR3. The other terminal is connected to the ground reference. The secondary winding of the transformer TR3 is conneced across a capacitor 141 which resonates with the inductance of the secondary windings. One terminal of the capacitor 141 is connected to a common point between resistors 143 and 144 which are serially connected between a +V reference and a ground reference. That common point is also connected to one input terminal of an amplifier 145. The other terminal of the capacitor 141 is connected directly to the other terminal of the amplifier 145. The +V reference is also applied directly to the amplifier 145. The amplifier 145 is referenced directly to ground and also through a resistor 147 thereto. At the input to amplifier 145 the signal is essentially sinusoidal due to the filtering action of TR1 and capacitor 121, TR2 and capacitor 127, TR3 and capacitor 141 upon the drive waveforms which were digitally generated. Amplifier 145 amplifies and limits (clips) this into an essentially square wave signal for further digital processing. The output terminal of the amplifier 145 provides an inverted modified heading signal $\overline{H1}$ which is in turn applied to an inverter circuit 149 to provide a modified heading output signal H1 from the amplifier-limiter circuit 33.

Figures 8, 9:
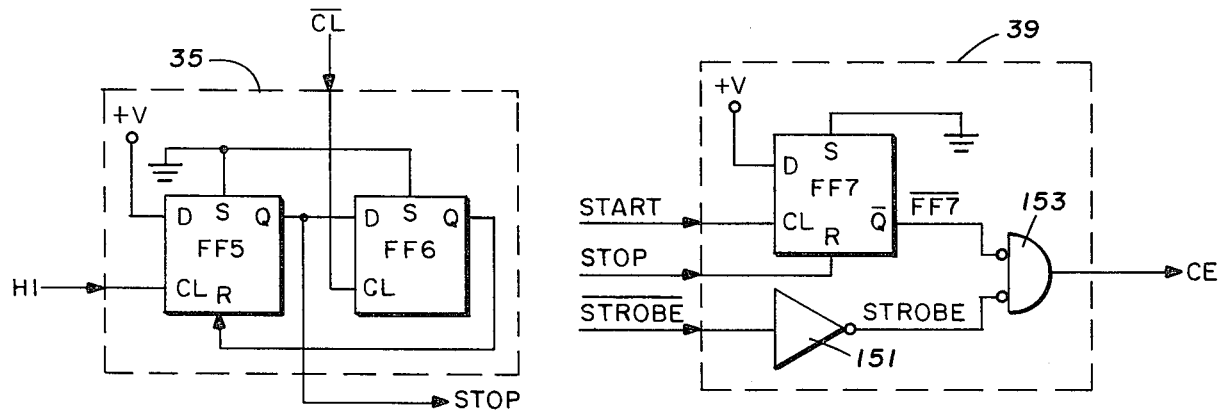
FIG. 8 is a schematic diagram of the stop signal generator shown in FIG. 2.
FIG. 9 is a schematic diagram of the counter enable circuit shown in FIG. 2.

The stop signal generating means 35 includes two flip-flop circuits FF5 and FF6 as shown in FIG. 8. The modified heading signal H1 is applied to the clock input terminal of FF5. The data input terminal thereof is connected to the +V or logic "1" reference potential. The set input terminals of FF5 and FF6 and the reset terminal of FF6 are connected to ground. The Q output terminal of FF5 is connected to the data input terminal of FF6 and also provides the STOP output signal from the stop signal generating means 35. The inverted clock signal $\overline{CL}$ is applied to the clock input terminal of FF6. The Q output terminal of FF6 is connected back to the reset input terminal of FF5.

The counter enable circuit 39, shown in detail in FIG. 9, includes a flip-flop circuit FF7, an inverter 151, and a gate 153. The START signal is applied to the clock input terminal of FF7, the data input terminal of which is connected to a logic 1 or +V reference potential. The STOP signal is applied to the reset input terminal of FF7 and its set input terminal is connected to the ground reference. The $\overline{STROBE}$ signal is applied to the inverter 151, the output terminal of which is connected to one input terminal of the gate 153. The other input terminal of the gate 153 is connected to the $\overline{Q}$ output terminal of FF7. The gate 153 provides the counter enable output signal CE from the counter enable circuit 139.

Figure 12:
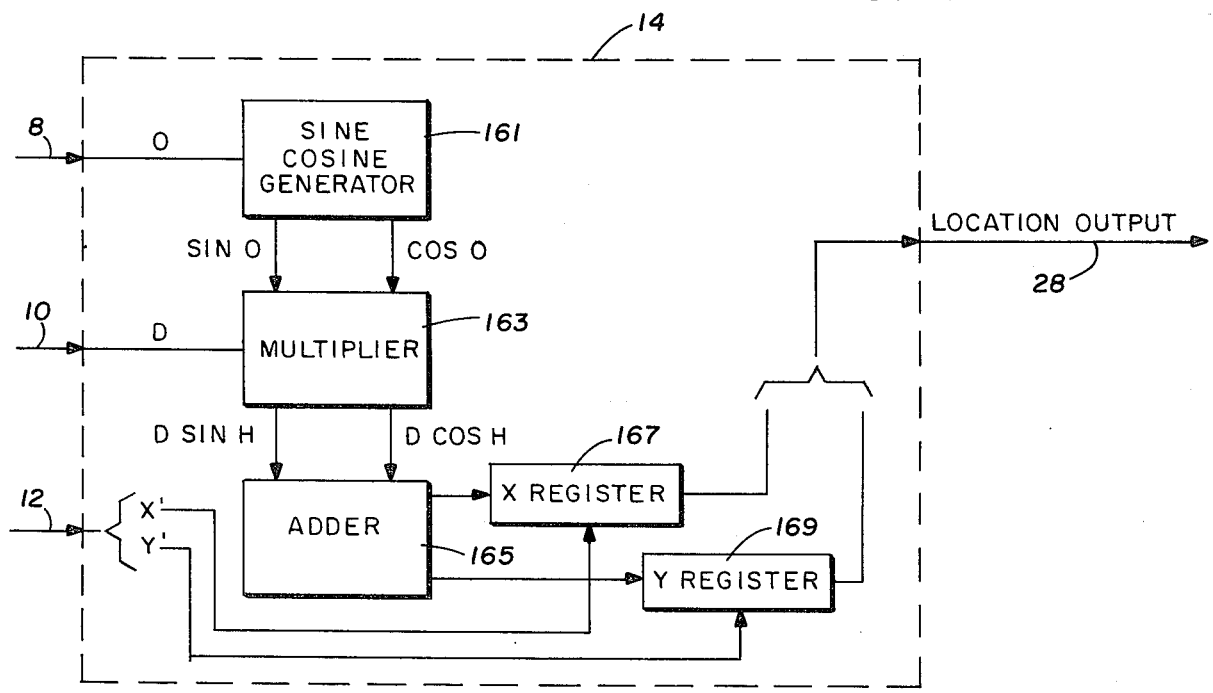
FIG. 12 is a schematic diagram of the location processor circuit of FIG. 2.

In FIG. 12, a sine/cos generator 161 receives the orientation signal O from the heading sensor 2. The sine and cos of the orientation angle represented by the orientation signal O is derived and applied to a multiplier 163. The multiplier 163 also receives a signal D from the wheel sensor 4 which is representative of the distance traveled by the vehicle. The signal D, for example, may comprise a series of pulses with each pulse representing a predetermined increment of distance travelled by the vehicle. The multiplier provides output signals representative of the increments of distance traveled multiplied by the sine and cos of the vehicle orientation angle signal O, respectively. Those component increment signals are algebraically added in an adder circuit 165 which has one output to an X register 167 and another output to a Y register 169. The X and Y registers 167 and 169 also receive inputs X' and Y' from the update receiver 6 which replace the dead reckoning location data stored in the registers. The X and Y registers 167 and 169 provide outputs on line 28 representative of the location of the vehicle.

Figure 11:
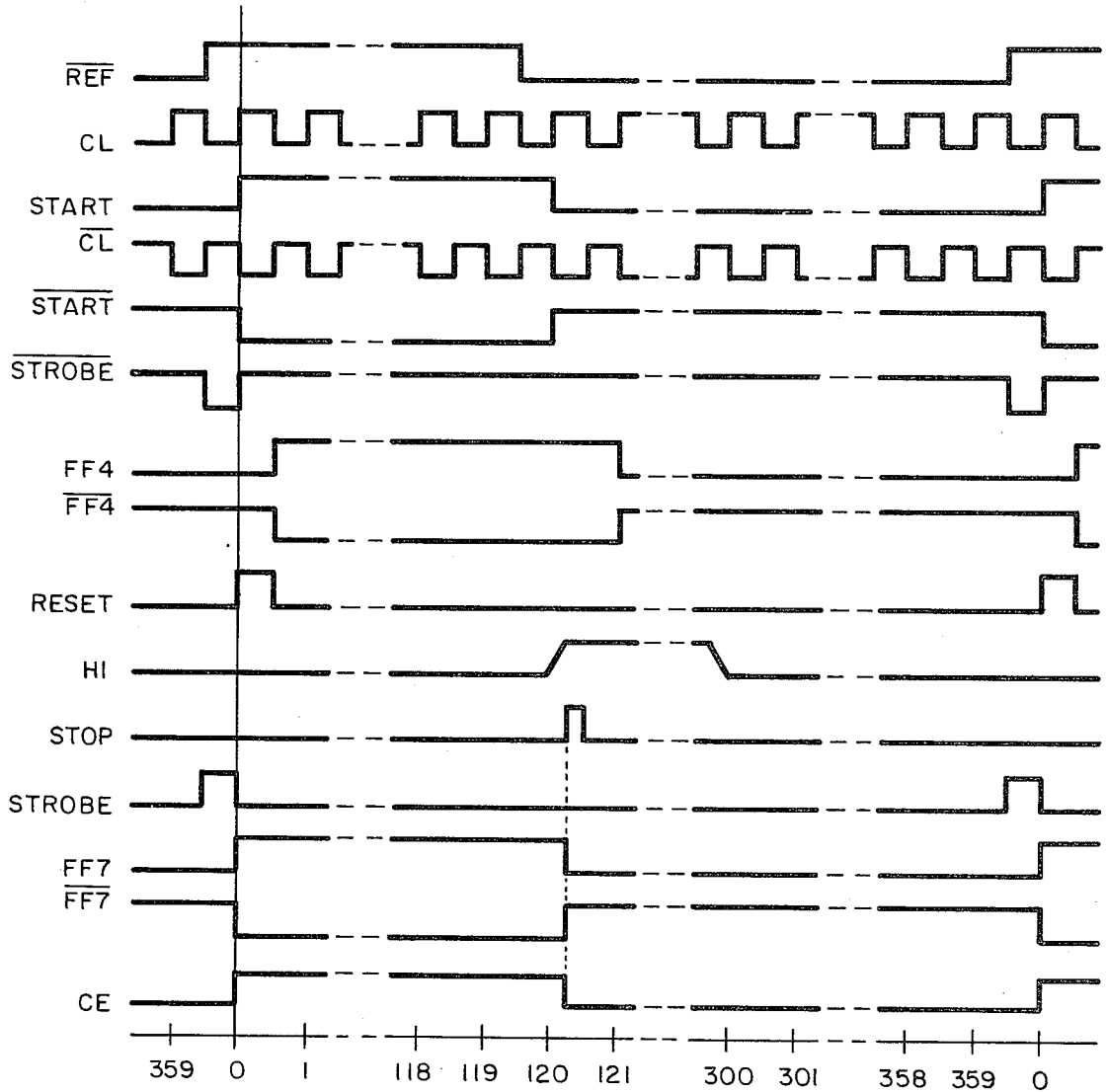
FIG. 11 is a wave form chart illustrating the interrelationships of additional signal developed within the heading sensor circuit.

In operation, the clock oscillator 1 of the heading sensor 2 provides substantially square wave signals at a first predetermined frequency to a buffer circuit 3, which in turn provides the clock signals CL for application to the first and second divider circuits 5 and 7. The wave form of the basic clock signal CL is shown in FIG. 11. The first and second divider circuits 5 and 7 are operable to divide the basic clock signal CL by 360, i.e., for every 360 positive going edges of the basic clock signal CL there is one positive going edge in the signals REF, T1, T2, T3, and T4, from the second divider circuit 7. The reference signal REF goes low, i.e., to a logic 0 level which is approximately 0 volts or ground in the present example, just prior to time zero as shown in FIG. 9. The REF signal thereafter goes high, i.e., to the logic 1 level which is approximately 9 volts in the present example, between counts 119 and 120 of the clock signal. For purposes of explanation, a readout cycle, as hereinafter referred to, includes 360 positive going edges of the clock signal CL. The REF signal is inverted by the inverter circuit 11 and is shown in FIG. 11. The broken lines in FIG. 11 refer to a passage of clock pulses as indicated by the abcissa markings of the chart wave form shown in FIG. 11. The flip-flop circuit FF3 of the start signal generating means 37 shown in detail in FIG. 6 receives the inverted reference signal $\overline{REF}$ at its data input terminal and receives the clock signal CL at its clock input terminal. When a D-type flip-flop circuit, as used throughout the present disclosure, receives a logic 1 level at its data input terminal the Q output terminal thereof will go high with the next positive going edge of the signal applied to its clock input terminal. Therefore, since $\overline{REF}$ goes high just prior to each readout cycle, i.e., between counts 359 and 0 or 360 as shown in FIG. 11, the START signal from the Q output terminal of FF3 will accordingly go high with the next high going clock signal CL. Therefore, the START signal will go high at the beginning of each readout cycle at count 0, as shown in FIG. 11. Similarly, when the signal applied to the data input terminal of a D-type flip-flop circuit goes low, the Q output signal thereof will go low with the next detected positive going edge of the signal applied to its clock input terminal. Therefore, when the $\overline{REF}$ signal goes low after count 119, the start signal will return to a low logic level at count 120 with a positive edge of the clock signal. The start signal shown in FIG. 11 will thereafter be generated once during each readout cycle of the solid state compass of the present invention.

Figure 10:
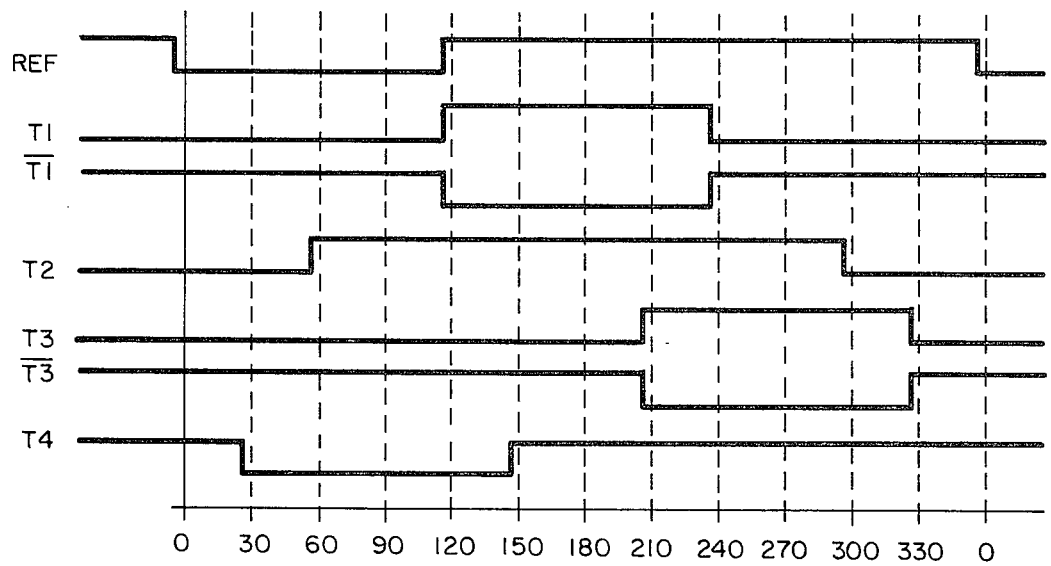
FIG. 10 is a wave form chart showing the interrelationships of several of the signals generated within the heading sensor circuit of FIG. 2.

The relationship of the timing signals T1, T2, T3, and T4 is shown in FIG. 10. The inverter circuits within the driving circuit 9 apply the signals $\overline{T1}$, T2, $\overline{T3}$ and T4 to the transistors 95, 103, 109, and 117, respectively. The transistors or switching means of the driving circuit 9 become conductive when a low logic level is applied to the base electrodes thereof. Whenever the transistors 95 or 103 are rendered conductive, positive pulses of energy are applied to the resonant circuit comprising the capacitor 121 and the primary winding of the transformer TR1. The component values of the capacitor 121 and the primary winding of the transformer TR1 are chosen so that the resonant circuit comprised thereby provides a signal having a period equal to 360 clock pulses, i.e., having the same period as a readout cycle. Similary, whenever the transistors 109 or 117 are rendered conductive a positive pulse of energy is supplied to the resonant circuit comprising the capacitor 127 and the primary winding of the transformer TR2. The component values of the second resonant circuit are also chosen to provide a resonant signal which oscillates at a period equal to 360 clock pulses. Referring to FIG. 10, $\overline{T1}$ is at a logic 0 level, and therefore transistor 95 is conducting, from just preceding clock pulse 120 to just preceding clock pulse 240. In other words, transistor 95 is conducting for a period of time equal to 120 clock pulses centered about a point just ahead of clock pulse 180. Timing signal T2 goes low just preceding clock pulse 300 and remains low until just preceding clock pulse 60 of the next readout cycle. Therefore, transistor 103 is conducting for 120 clock pulses centered just ahead of the beginning of each readout cycle. Transistor 109 which receives the signal $\overline{T3}$ is similarly conductive to energize the resonant circuit comprising the capacitor 127 and the primary winding of the transistor TR2 when $\overline{T3}$ is at a low logic level, i.e., for a period of time equivalent to 120 clock pulses centered about a point just before clock pulse 270. Transistor 117 is conductive when timing signal T4 is at a low logic level which is for a duration of 120 clock pulses centered about a point immediately preceding clock pulse 90. The effect of the sequential energization from different sides of the two resonant circuits is to provide driving or excitation signals in the form of sine and cos waves from timing signals which are in the form of substantially rectangular waves. The first resonant circuit which includes the capacitor 121 and the primary winding of the transformer TR1 provides a cos signal between the output terminals 16 and 20 of the driving circuit 9. The cos signal thus provided has a period equal to a readout cycle or 360 clock counts beginning with time 0 of FIG. 11 which respect to the logic signals illustrated therein. Similarly, the second resonant circuit including the capacitor 127 and the primary winding of the transformer TR2 provides a driving or excitation signal across the output terminals 22 and 26 of the driving circuit 9 in the form of a sine wave having a period equal to 360 clock pulses or one readout cycle beginning with time 0 of FIG. 11 with respect to the other logic signals illustrated therein.

Because of the physical arrangement of the heading Hall effect element and the transverse Hall effect element and the connection therebetween as shown in FIG. 2, the output signals from the heading Hall effect element 15 and the transverse Hall effect element 13 are combined to provide the heading signal H, which, in the present example, is in the form of a sinusoidal wave having a period equal to 360 clock pulses or a readout cycle, but being displaced in time from the 0 axis shown in FIG. 11 by an amount proportional to the clockwise angle from magnetic north to the axis of orientation of the heading Hall effect element 15. Since a readout cycle is designed to include 360 clock pulses and the driver circuit 9 is designed to provide the sine and cos driving signals having a 360° period concurrent with the 360 counts occurring in a readout cycle, the count at which the sine wave heading signal first goes positive with respect to the 0 axis corresponds to the number of clockwise degrees from magnetic north to the axis of orientation of the heading Hall effect element 15. Thus, in the present example, by determining at which counter the heading signal H first goes positive in each readout cycle, the orientation angle between magnetic north and the angle to which the heading Hall effect sensor 15 is directed can also be determined.

In explaining a typical operation of the exemplary embodiment of the present invention, it will be assumed that the heading Hall effect sensor 15 is directed at an angle of 120° clockwise from magnetic north. The amplifier-limiter circuit 33 as shown in detail in FIG. 7 is operable to amplify the sine wave heading signal and then limit that signal to provide a modifed heading signal H1 as shown in FIG. 11. When the angle of orientation of the heading Hall effect sensor 15 is 120°, the modified heading signal H1 will begin to go positive after 120 clock pulses in the readout cycle. The amplification of the amplifier-limiter circuit 33 is such that the modified heading signal H1 will reach a logic 1 level within a half count from the time it begins to go positive. The modified heading signal H1 will go low to the logic 0 level 180 counts later at the count of 300, as shown in FIG. 11.

The stop signal generating means 35 receives the modified heading signal H1 at the clock input terminal of FF5. Since the data input terminal of FF5 is connected to a logic 1 reference potential, the Q output terminal of FF5 or the STOP signal will go high whenever the modified heading signal H1 goes high. As shown in FIG. 11, the modified heading signal H1 goes high after a count of 120 and the STOP signal will thereafter follow to the high logic level. Since the Q output terminal of FF5 is connected to the data input terminal of FF6, when the STOP signal goes high, the Q output signal of FF6 will go high with the next high going pulse received at its clock input terminal. Therefore, the Q output of FF6 will go high midway between counts 120 and 121 when the next $\overline{CL}$ high going pulse appears. Since the Q output signal of FF6 is connected back to the reset input terminal of FF5, as soon as the Q output terminal of FF6 goes high, FF5 will reset and the Q output signal of FF5 will return to the low logic level to await the next high going pulse of the modified heading signal H1 in the next readout cycle. Thus, a STOP signal is generated after a number of clock pulses have been provided, beginning with the generation of a START signal, which corresponds to the orientation angle between the heading Hall effect element 15 and magnetic north.

The counter enable circuit 39 which is shown in detail in FIG. 9, receives the START signal at the clock input terminal FF7. Since the data input terminal of FF7 is connected to a logic 1 potential, the $\overline{Q}$ output terminal of FF7 will go low with a high going pulse of the START signal. The STOP signal is applied to the reset input terminal of FF7 and therefore when the STOP signal appears, FF7 will be reset and the $\overline{Q}$ output terminal of FF7 will again go high. In the present example, since the STOP signal goes high after a count of 120, the $\overline{Q}$ output terminal of FF7, which provides a signal referred to as $\overline{FF7}$, will go low at the 0 count in response to the START signal and will again go high after a count of 120 in response to the STOP signal.

Referring back to the start signal generating circuit 37 shown in FIG. 6, it can be seen that the $\overline{STROBE}$ signal will go low whenever the $\overline{REF}$ signal is high and the $\overline{Q}$ output signal from FF3 is high. Since the $\overline{Q}$ output signal from FF3 is substantially the inversion of the Q output from FF3 of the START signal, the $\overline{STROBE}$ signal will go low at a time corresponding to count 359½ and will again go high at a corresponding to count 360 or 0 as shown in FIG. 11.

Referring again to the counter enable circuit shown in FIG. 9, the $\overline{STROBE}$ signal is inverted by the inverter 151 and applied along with $\overline{FF7}$ to the gate 153. When both of those signals STROBE and $\overline{FF7}$ are at a low logic level the output counter enable signal CE will be at a high logic level. Therefore, the CE signal will go high at 0 count and return to the 0 or low logic level between counts 120 and 121 since the angle of orientation in the present example is 120°. Thus, it is apparent that the CE signal will go to a high logic level during each readout cycle at a time corresponding to a 0 count in response to the generation of a start signal, and will subsequently go to a low logic level during each readout cycle at a time determined by the generation of a STOP signal. Since the time between the appearance of a START signal and the appearance of a STOP signal is proportional to the number of degrees between the direction of orientation of the heading Hall effect sensor 15 and magnetic north, the counter enable signal will be high during each readout cycle for a time corresponding to the orientation angle.

The gate 41 shown in FIG. 2 allows the passage of the CL pulses to the counter means 43 while the counter enable signal CE is at a high logic level. Therefore, during readout cycle, the counter will count a number of clock pulses corresponding to the number of degrees in the angle of orientation between the axis of the heading Hall effect element 15 and magnetic north. That count in the form of a three digit binary coded decimal signal is applied to the latch circuit 45. The latch circuit 45 responds to the STROBE signal which appears between count 359 and count 0, at the end of each readout cycle, to hold the count in the counter at that time for application to the sine-cos Generator 161 of the signal processor 14 during the next cycle while the orientation angle is again being detected. The latch circuit or memory means will hold the count until the appearance of the next STROBE signal or readout signal at which time the new count in the counter will replace the old count in the latch circuit 45.

Referring to FIG. 6, the RESET signal is generated by the start signal generating means 37. The RESET signal will go high whenever the START signal is high and the Q output of FF4 or $\overline{FF4}$ goes high. Therefore, the RESET signal will go high at a count of 0 but will return to the low logic level before the count 1 is reached. Thus, the STROBE signal effectively passes the count in the counter 43 to the latch circuit after a count of 359 has been reached to insure that an orientation angle of 359° can be read, and after that count is locked into the latch circuit 45, the counter circuit 43 is reset to begin counting clock pulses during the next readout cycle.

The embodiments of the present invention in which an exclusive property or privilege is claimed are defined as follows:

1. A vehicle locating apparatus arranged to be carried by a vehicle for determining the location of the vehicle, the apparatus comprising: heading means operable to provide an orientation signal indicative of an angle of orientation of said compass means with respect to magnetic north;

distance detecting means operable to provide a distance signal representative of the distance traveled by the vehicle;

processor means responsive to said orientation signal and said distance signal for providing location signals representative of the location of the vehicle;

storage means for storing said location signals, said processor means being operable to update said stored location signals whenever the vehicle has traveled a predetermined distance; and receiving means operable when the vehicle is within predetermined areas, for receiving predetermined position signals corresponding to the predetermined areas, said processor means being responsive to said position signals for updating said stored location signals in accordance with said received position signals.

2. The apparatus as set forth in claim 1 wherein said solid state compass means comprises a Hall effect device.

3. The apparatus as set forth in claim 2 wherein said Hall effect device includes mutually perpendicular heading and transverse Hall elements.

4. The apparatus as set forth in claim 1 wherein the vehicle is a wheeled vehicle, said distance detecting means comprising sensing means arranged to be operatively coupled to one wheel of the vehicle, said sensing means being operable to provide said distance signal whenever said one of the vehicle wheels rotates a predetermined amount.

5. The apparatus as set forth in Claim 1 wherein said processing means includes a sine and cos generating means responsive to said orientation signal for providing component signals representative of the sine and cos of said angle of orientation of the vehicle.

6. The apparatus as set forth in claim 5 wherein said processing means includes multiplier means responsive to said component signals and said distance signal for providing component increment signals representative of incremental changes in said component signals corresponding to movement of the vehicle over a predetermined distance.

7. The apparatus as set forth in claim 6 wherein said processing means includes an adder circuit responsive to said incremental component signals for adding said incremental component changes to said stored location signals.

8. The apparatus as set forth in claim 1 and further including transmitting means connected to said processing means, said transmitting means being operable for transmitting said location signals to a remote station.

* * * * *